US012774039B2

(12) United States Patent
Delaruelle et al.

(10) Patent No.: US 12,774,039 B2
(45) Date of Patent: Oct. 27, 2026

(54) CROSS CAR BEAM

(71) Applicant: Ford Global Technologies, LLC, Dearborn, MI (US)

(72) Inventors: Aurélien Pierre Christian Delaruelle, Yarraville (AU); Paul Madavanakkatt, Craigieburn (AU); Prakash Shrestha, Mulgrave (AU)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 18/413,110

(22) Filed: Jan. 16, 2024

(65) Prior Publication Data

US 2025/0229841 A1 Jul. 17, 2025

(51) Int. Cl.
*B62D 25/14* (2006.01)
*B60R 16/02* (2006.01)

(52) U.S. Cl.
CPC ........ *B62D 25/145* (2013.01); *B60R 16/0215* (2013.01)

(58) Field of Classification Search
CPC .......................... B62D 25/145; B60R 16/0215
See application file for complete search history.

(56) References Cited

U.S. PATENT DOCUMENTS

| | | | | |
|---|---|---|---|---|
| 9,580,107 | B1 | 2/2017 | Ranga | |
| 2002/0038965 | A1 | 4/2002 | Palazzolo et al. | |
| 2014/0103685 | A1 | 4/2014 | Mani | |
| 2022/0119042 | A1* | 4/2022 | Zhang | B60K 37/10 |
| 2025/0326442 | A1* | 10/2025 | Zhang | B62D 25/145 |

FOREIGN PATENT DOCUMENTS

| | | | | |
|---|---|---|---|---|
| CN | 103311851 | B | 9/2013 | |
| CN | 110549963 | A | 12/2019 | |
| CN | 114560015 | A * | 5/2022 | B62D 25/12 |
| CN | 116142320 | A | 5/2023 | |
| EP | 1544085 | A2 * | 6/2005 | B62D 29/004 |
| JP | 2003182472 | A * | 7/2003 | |
| JP | 4109390 | B2 * | 7/2008 | |
| JP | 5168444 | B2 | 3/2013 | |

* cited by examiner

*Primary Examiner* — Daniel J Colilla
(74) *Attorney, Agent, or Firm* — Vichit Chea; Price Heneveld LLP

(57) ABSTRACT

A structural support apparatus is configured to extend laterally through a vehicle. The apparatus includes a beam defining an open channel. The open channel is configured to receive a loom of wiring. The beam includes a first extremity wall, and a second extremity wall spaced from the first extremity wall by the open channel. The structural support apparatus also includes at least one bracket bridging the first extremity wall and the second extremity wall.

6 Claims, 8 Drawing Sheets

CROSS CAR BEAM

FIELD OF THE DISCLOSURE

The present disclosure generally relates to a structural support system for a vehicle, and more particularly relates to a car beam, such as a stamped U-shaped cross car beam.

BACKGROUND OF THE DISCLOSURE

Vehicles may be equipped with a cross-car beam. The cross-car beam may occupy space within the vehicle. It would be desirable for a cross car beam to occupy less space within the vehicle.

SUMMARY OF THE DISCLOSURE

According to a first aspect of the present disclosure, a structural support apparatus extends laterally through a vehicle. The apparatus includes a beam defining an open channel. The beam includes a first extremity wall, and a second extremity wall spaced from the first extremity wall by the open channel. The structural support apparatus also includes at least one bracket bridging the first extremity wall and the second extremity wall.

Embodiments of the first aspect of the present disclosure can include any one or a combination of the following features:

- the beam has a first cross-section distal from a steering column area, and wherein the beam has a second cross-section larger than the first cross section, the second cross-section proximal the steering column area;
- at least one of the first extremity wall and the second extremity wall define at least one recess;
- the at least one of the first extremity wall and the second extremity wall include a flange around a periphery of the at least one recess;
- the at least one bracket mounts an airbag assembly with the beam;
- the at least one bracket stiffens the beam;
- the at least one bracket stiffens the beam proximal a steering column area;
- the at least one bracket is secured with the first extremity wall and the second extremity wall via a plurality of fasteners;
- the beam at least partially supports an electrical system inside the open channel of the beam;
- the electrical system is secured within the open channel by the first extremity wall, the second extremity wall, and the at least one bracket; and
- the beam is stamped from a single or multiple metal sheet.

According to a second aspect of the present disclosure, a system for structurally supporting a vehicle. The system includes a beam extending laterally within the vehicle. The beam defines an open channel configured to receive a loom. The beam includes a rear extremity wall and a front extremity wall coupled with the rear extremity wall at a bottom of the beam. The front extremity wall includes a flanged recess for the loom to extend outwardly from the open channel of the beam. The system also includes a plurality of brackets coupled with the beam across the open channel, wherein the plurality of brackets is configured to increase a rigidity of the beam, fasten with the beam to enclose the loom within the open channel, and unfasten from the beam to reveal the wiring within the open channel.

Embodiments of the second aspect of the present disclosure can include any one or a combination of the following features:

- the plurality of brackets is further configured to provide a respective plurality of mounting locations;
- an instrument panel couples with at least one of the plurality of mounting locations;
- the beam defines a first cross-section at a first lateral end of the beam; and a second cross-section at a second lateral end of the beam, wherein the second cross-section is larger than the first cross section;
- the beam defines a variable cross-section between the first cross-section and the second cross section, and wherein the variable cross-section increases from the first cross-section to the second cross section; and
- the beam is stamped from a single or multiple sheet of metal.

According to a third aspect of the present disclosure, a structural support apparatus for a vehicle, the apparatus includes a beam extending laterally within the vehicle. The beam defining an open channel. The beam includes a rear extremity wall, and a front extremity wall coupled with the rear extremity wall at a bottom of the beam. The front extremity wall includes a flange and defines a recess. The apparatus also includes a bracket fastened with the rear extremity wall and the front extremity wall. The bracket bridges between the rear extremity wall and the front extremity wall. A distance between the rear extremity wall and the front extremity wall increases along a first direction of lateral extent. The apparatus further includes a loom of wiring enclosed within the open channel of the beam beneath the bracket. The loom of wiring extends through the recess.

Embodiments of the second aspect of the present disclosure can include any one or a combination of the following features:

- an instrument panel element mounts with the beam at the bracket; and
- the beam is a unitary body formed from a single or multiple sheet of metal.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
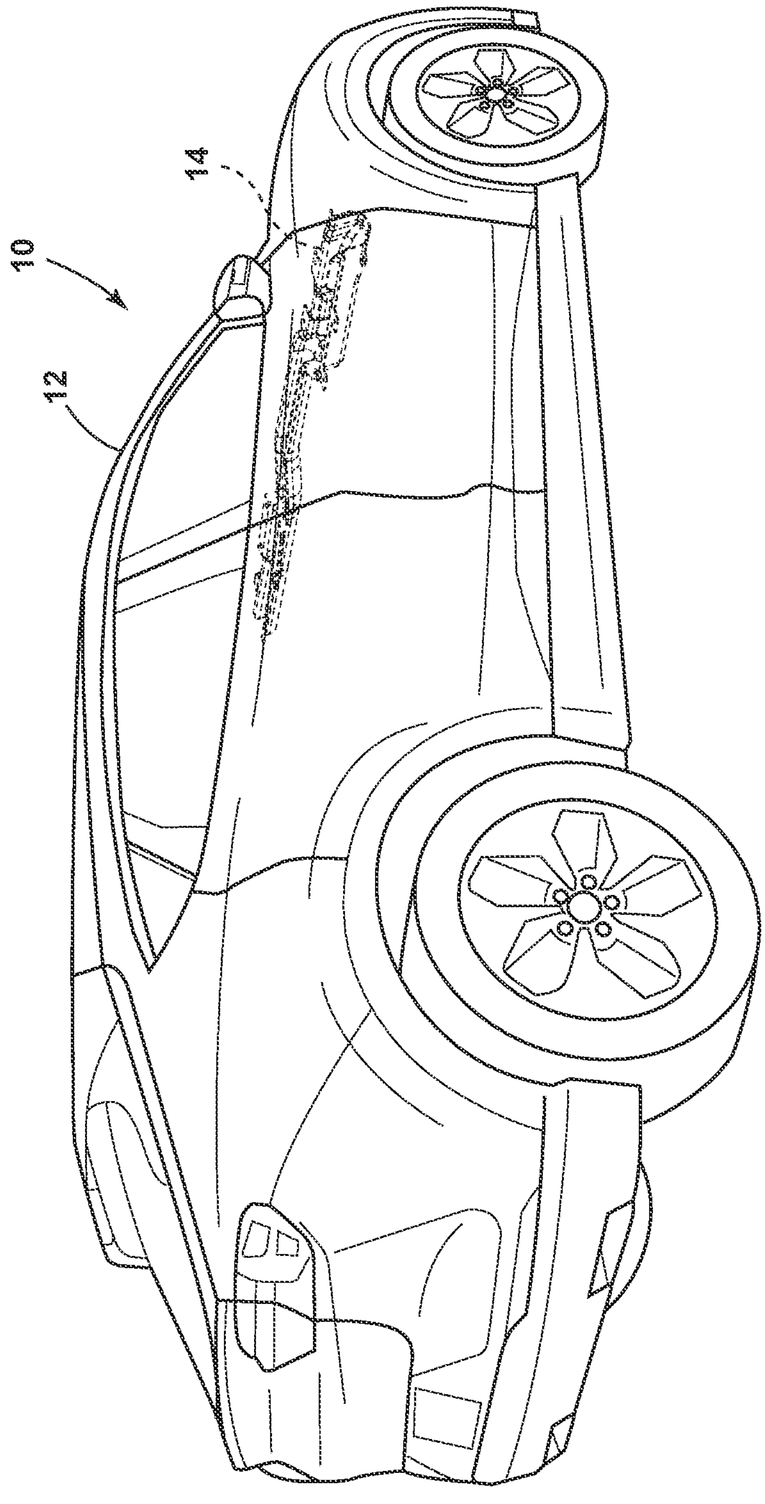
FIG. 1 is a rear side perspective view of a vehicle having a structural support apparatus.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a stamped U-shaped cross car beam for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIG. 1, a structural support apparatus 10 is disposed laterally within a motor vehicle 12, shown as a wheeled passenger vehicle. The vehicle 12 may be a car, SUV, truck, van or other vehicle. The structural support apparatus 10 may also be considered a structural support system, for example. Within the vehicle 12, and proximal a front end of the vehicle 12, the structural support apparatus 10 includes a beam 14. The beam 14 is illustrated oriented as a cross-car beam. The beam 14 generally extends laterally across and within the vehicle 12.

Figure 2:
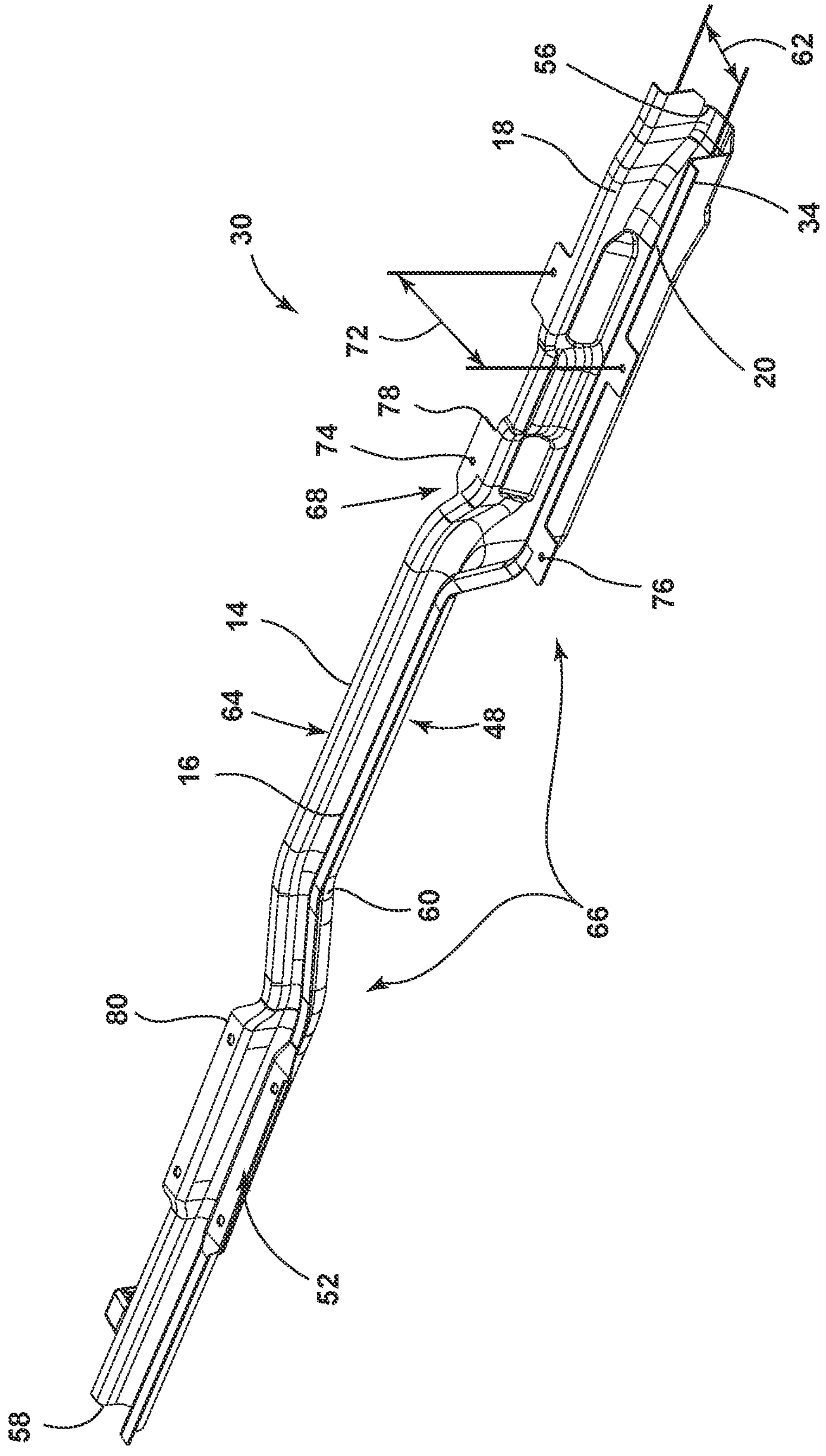
FIG. 2 is a top perspective view of a beam of the structural support apparatus.

With reference to FIG. 2, the structural support apparatus 10 includes the beam 14 which includes a first extremity wall 18 and a second extremity wall 20. The first extremity wall 18, may, for example, be oriented vehicle-forward of the second extremity wall 20 such that the first extremity wall 18 may be referred to as a front extremity wall. Therefore, the second extremity wall 20 may be referred to as a rear extremity wall. Additionally, or alternatively, for the vehicle 12 that has a reverse layout between a passenger and a driver, the first extremity wall 18 may be a rear extremity wall, and a second extremity wall 20 may, therefore, be a front extremity wall.

With further reference to FIG. 2, the beam 14 includes a bottom 60. The bottom 60 of the beam 14 is where the first extremity wall 18 joins, or is coupled with, the second extremity wall 20. The first extremity wall 18 and the second extremity wall 20 extend outwardly and upwardly from the bottom 60 of the beam 14. The beam 14 defines an open channel 16 between the first extremity wall 18 and the second extremity wall 20. At least one of the first extremity wall 18 and the second extremity wall 20 may extend toward the other of the first extremity wall 18 and the second extremity wall 20 above the open channel 16 without closing the open channel 16. As shown throughout the figures, but more specifically in FIGS. 6A-6C, the beam 14 includes a first cross-section 24, a second cross-section 26, and a variable cross-section 28 between the first cross-section 24 and the second cross-section 26. The beam 14 viewed from at least one of the first cross-section 24, the second cross-section 26, and the variable cross-section 28 may be generally U-shaped. Additionally, or alternatively, the beam 14 viewed from at least one of the first cross-section 24, the second cross-section 26, and the variable cross-section 28 may be generally circularly shaped. Further, the beam 14 viewed from at least one of the first cross-section 24, the second cross-section 26, and the variable cross-section 28 may be generally prismatic, or a combination of semi-circular, U-shape, and prismatic shapes.

Figure 3:
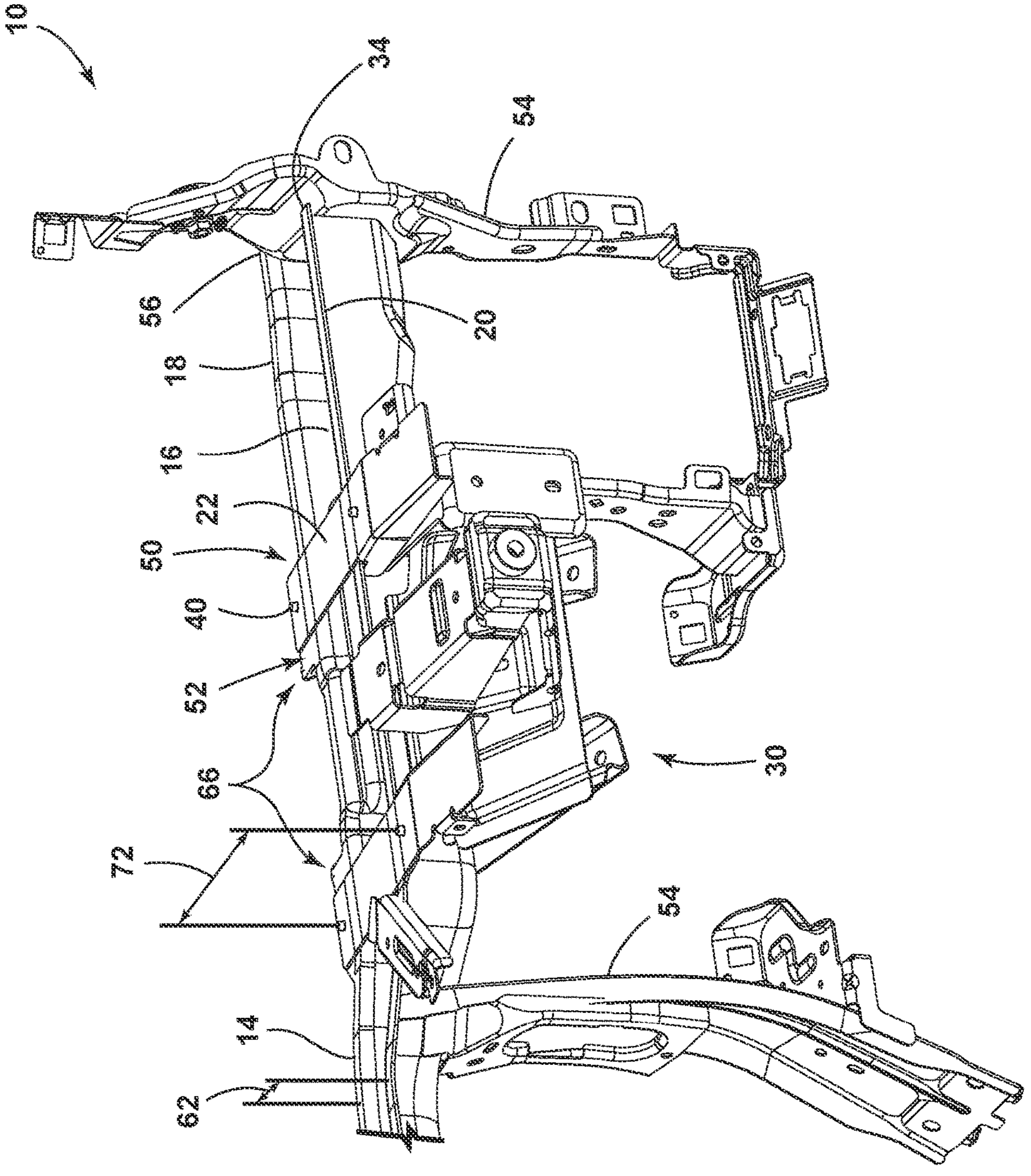
FIG. 3 is a top perspective view of the structural support apparatus at a first lateral end.
Figure 4:
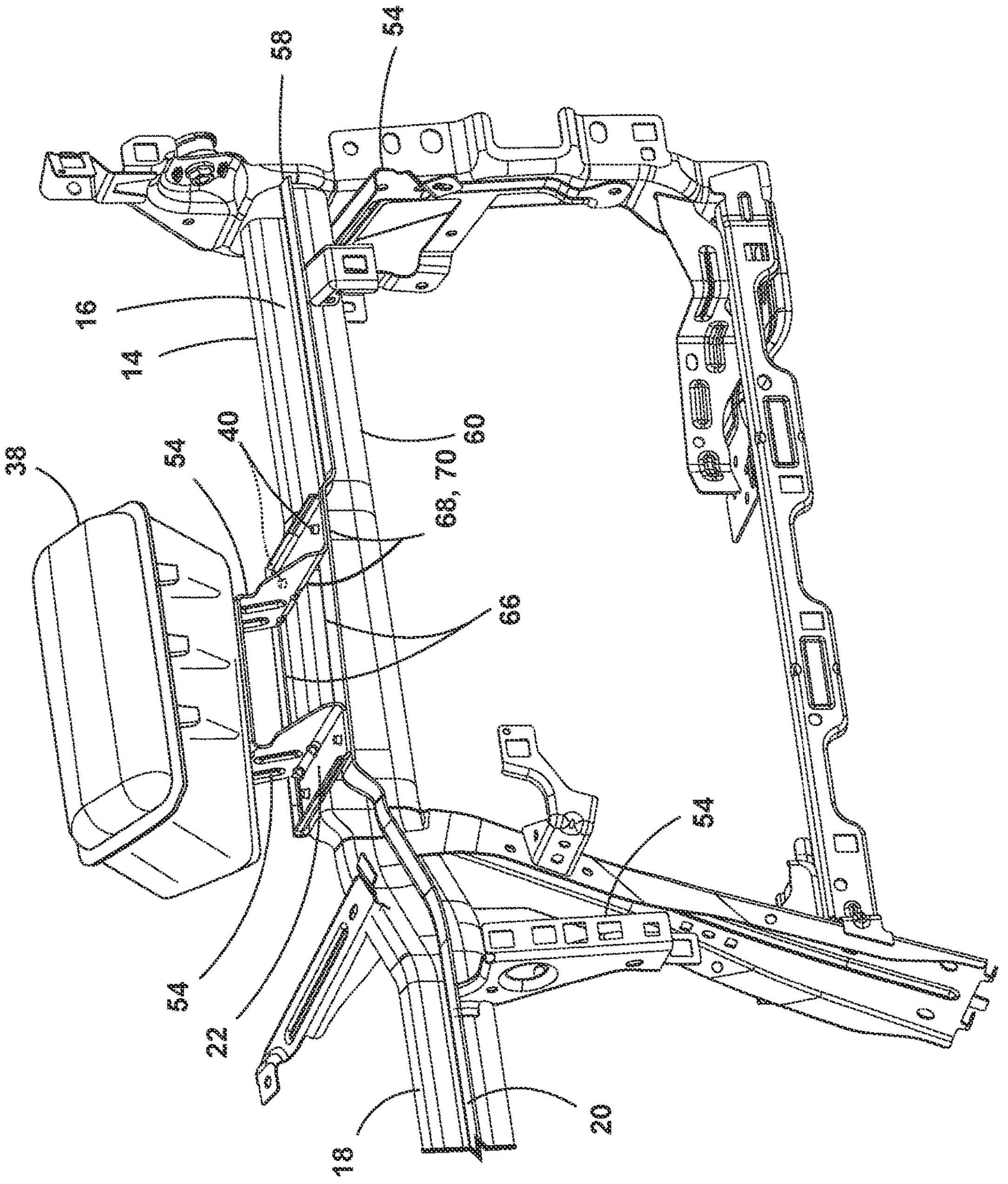
FIG. 4 is a top perspective view of the structural support apparatus at a second lateral end.
Figure 5:
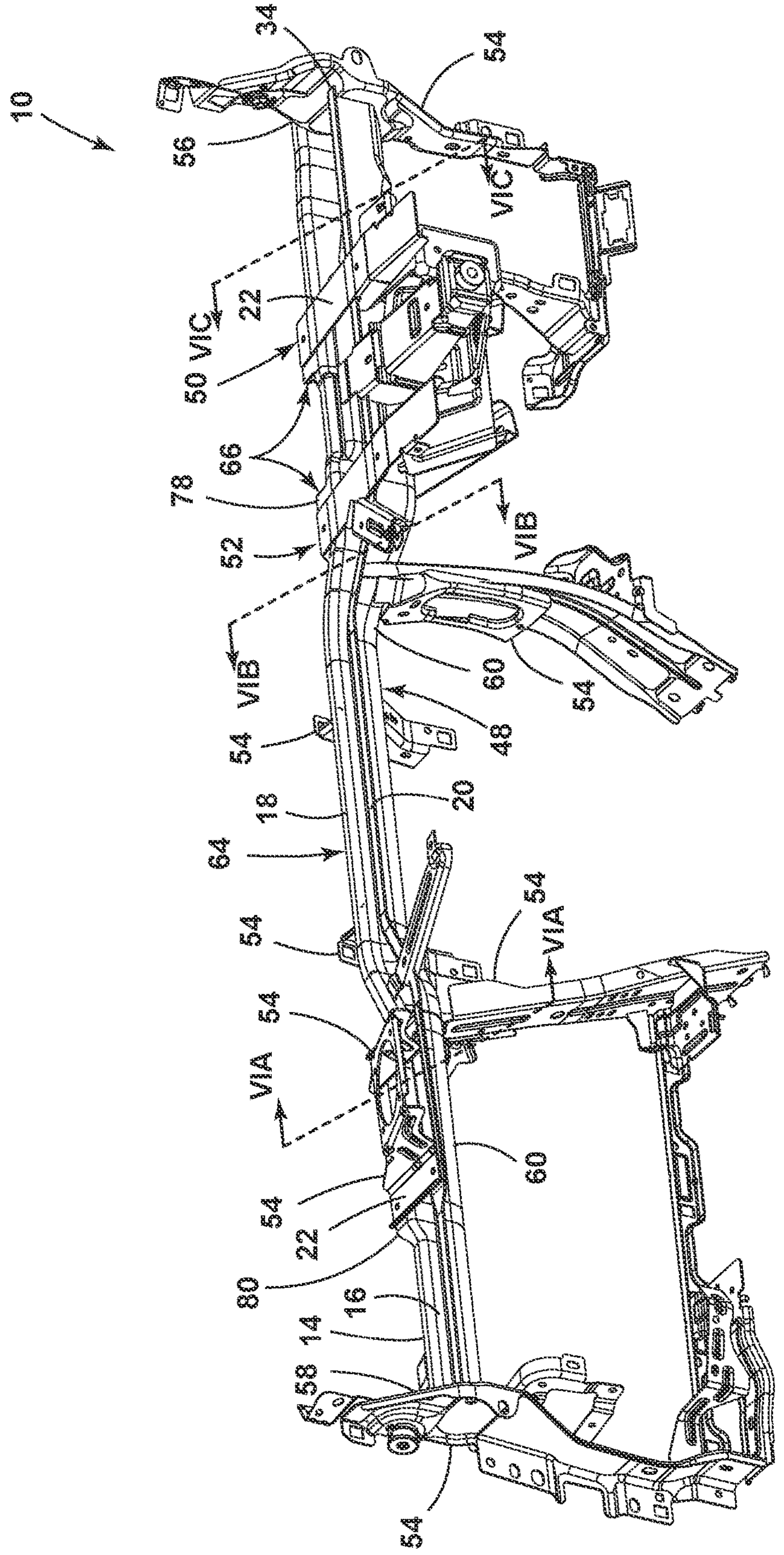
FIG. 5 is a top perspective view of the structural support apparatus.
Figure 6C:
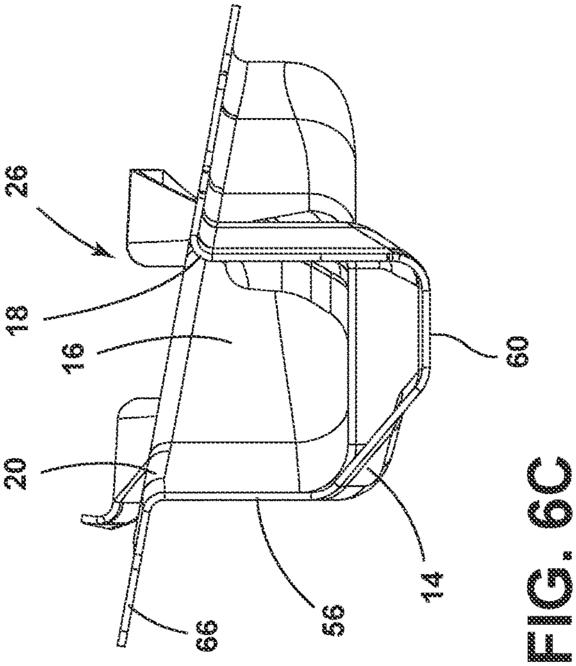
FIG. 6C is a cross-sectional view of the structural support apparatus taken along line VIC-VIC of FIG. 5.
Figure 6A:
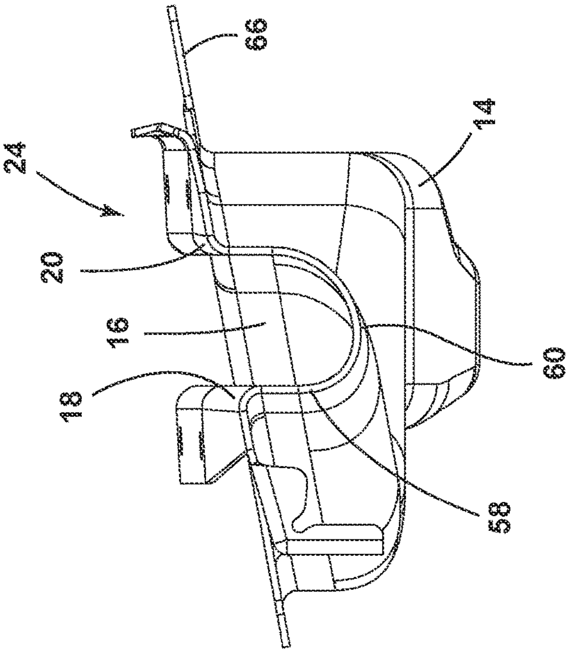
FIG. 6A is a cross-sectional view of the structural support apparatus taken along line VIA-VIA of FIG. 5.
Figure 6B:
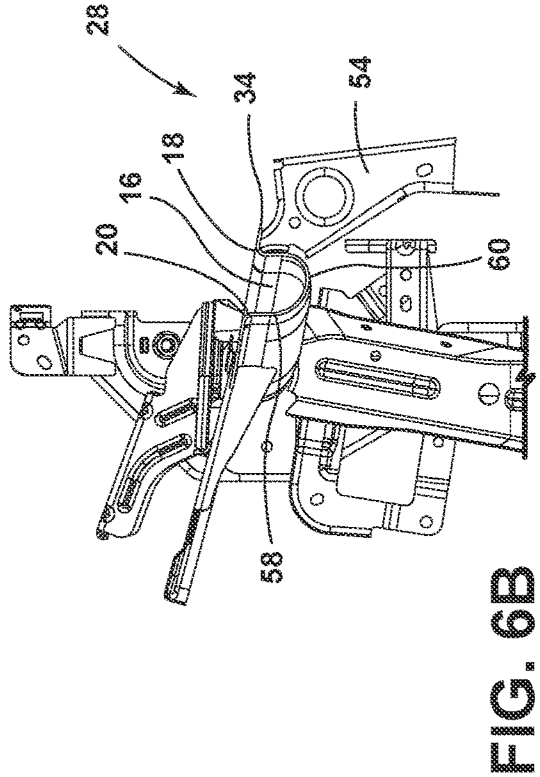
FIG. 6B is a cross-sectional view of the structural support apparatus taken along line VIB-VIB of FIG. 5.
Figure 7:
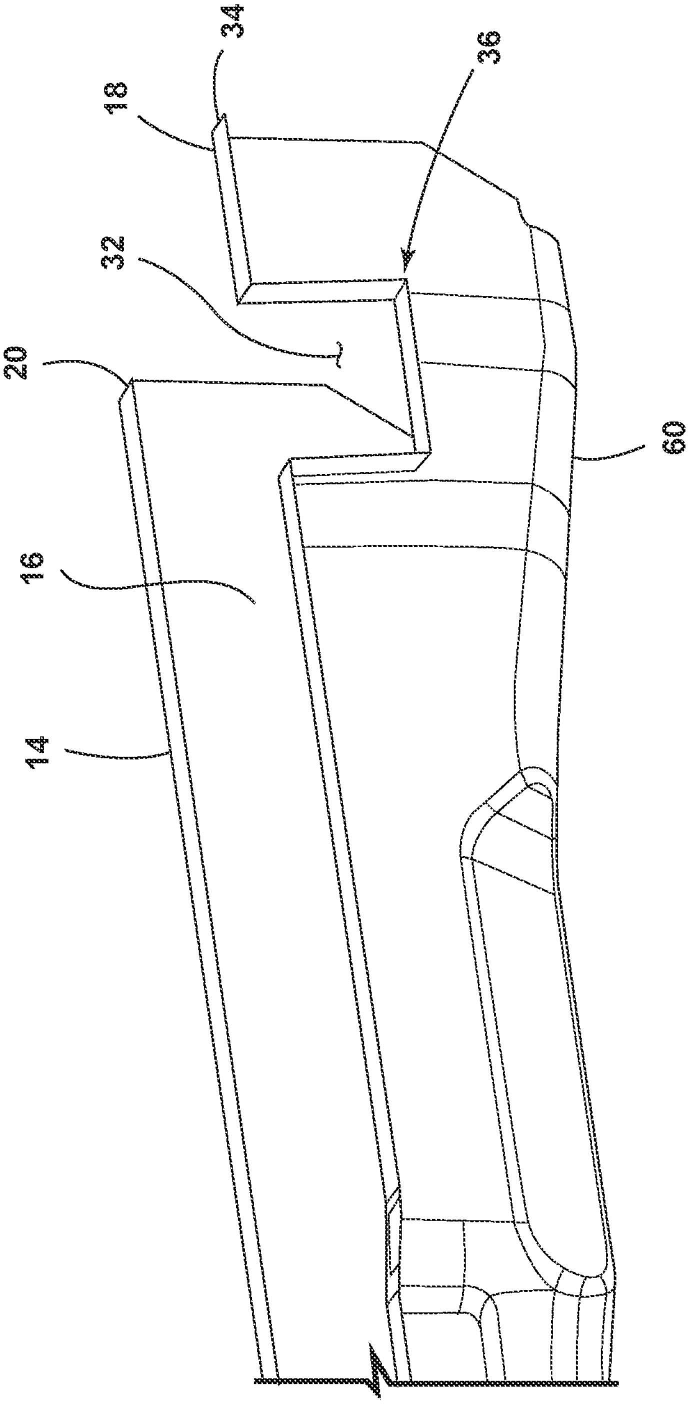
FIG. 7 is a top perspective view of the beam defining a recess.
Figure 8:
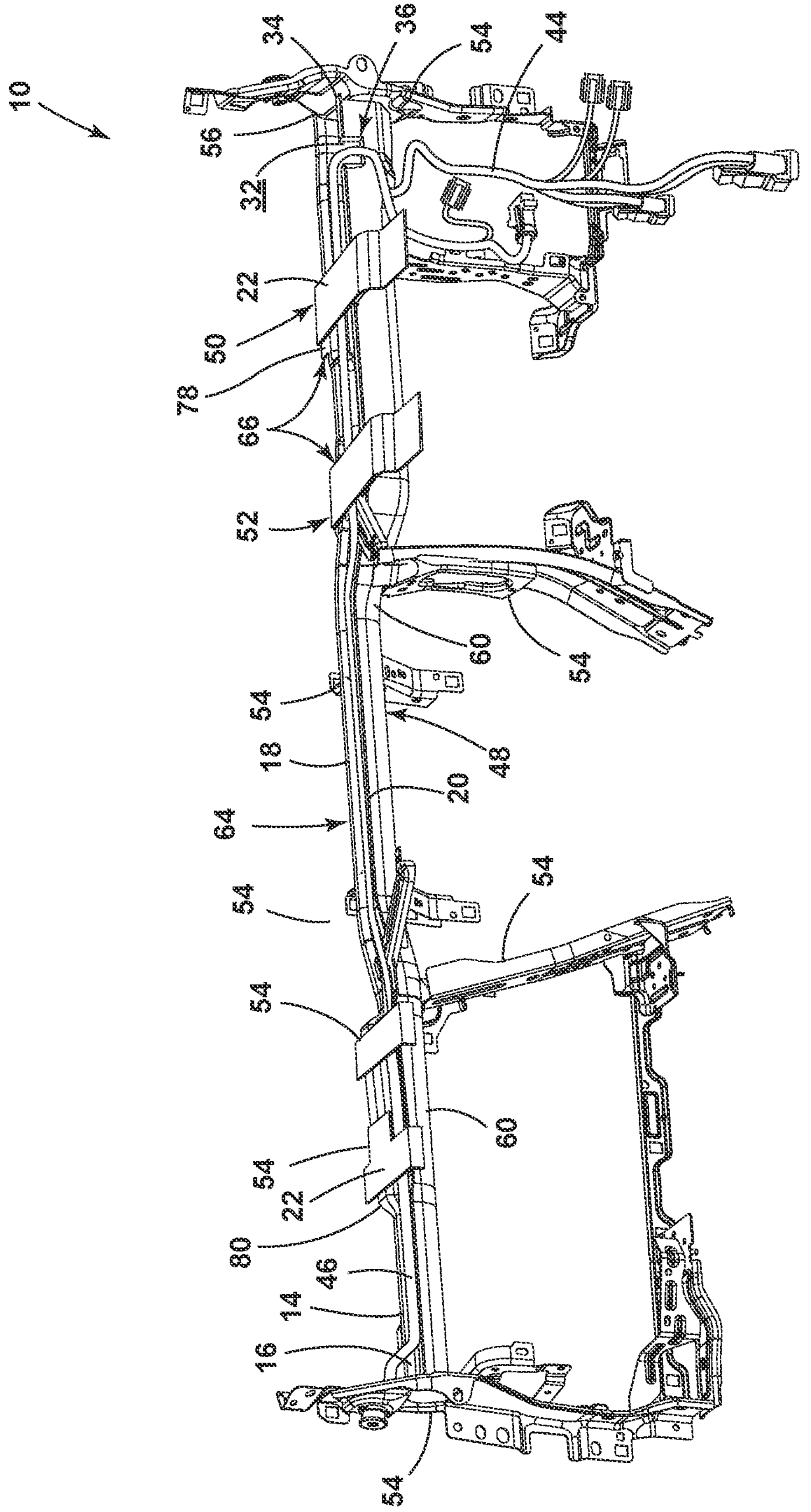
FIG. 8 is a top perspective view of the structural support apparatus containing a loom.

With further reference to FIG. 2, as well as FIGS. 3-8, the beam 14 generally extends laterally across and within the vehicle 12. Additionally, or alternatively, the beam 14 may also extend forward, backward, up, and down. For example, the beam 14 may extend forward near a steering column area 30, as shown in FIGS. 3, 5, and 8. Additionally, or alternatively, the beam 14 may extend forward near an airbag assembly 38, as shown in FIG. 4. The beam 14 may extend backward between the airbag assembly 38 and the steering column area 30, as shown in FIGS. 3-5 and 8.

With even further reference to FIG. 2-8, the first extremity wall 18 is spaced from the second extremity wall 20 by the open channel 16. In other words, the first extremity wall 18 is spaced from the second extremity wall 20 by a first distance 62. The first distance 62 may, for example, vary along a first direction of lateral extent of the beam 14. Additionally, or alternatively, the first distance 62 may remain constant for less than an entirety of the first direction of lateral extent of the beam 14. Additionally, or alternatively, the first distance 62 may increase along the first direction of lateral extent of the beam 14. Further, the first distance 62 may decrease along a reverse direction of the direction of lateral extent of the beam 14.

With even further reference to FIG. 2, the beam 14 may be stamped from a single sheet of metal 48. In other words, the beam 14 may include a unitary body 64. Additionally, or alternatively, the beam 14 may include a dual body welded together (not shown). Further, the beam 14 may include a body that comprises more than two welds (not shown). The beam 14 includes a plurality of bracket flanges 66. The bracket flanges 66 are configured to couple with a bracket 22. The bracket flanges 66 may be included with the unitary body 64 such that the plurality of bracket flanges 66 are formed from the same single sheet of metal 48. The bracket flanges 66 extend from at least one of the first extremity wall 18 and the second extremity wall 20. The plurality of bracket flanges 66 may outwardly extend away from the open channel 16. Additionally, or alternatively, the plurality of bracket flanges 66 may extend toward the open channel 16. Additionally, or alternatively, two or more of the bracket flanges 66 of the plurality may extend in a combination of toward and away from the open channel 16. The sheet of metal 48 may be steel. Additionally, or alternatively, the sheet of metal 48 may be low-carbon, cold-rolled steel. Additionally, or alternatively, the sheet of metal 48 may be another metal suitable for use as a cross-car beam in the vehicle 12.

With additional reference to FIG. 3, the structural support apparatus 10 includes the bracket 22. The bracket 22 may be at least one bracket. Additionally, or alternatively, the bracket 22 may be a plurality of brackets. The structural support apparatus 10 may include a plurality of brackets 22. The bracket 22 couples with the first extremity wall 18 and the second extremity wall 20 via at least one fastener 40. Additionally, or alternatively, the plurality of brackets 22 couple with the plurality of bracket flanges 66, respectively, via a plurality of fasteners 40. The at least one fastener 40 is unfastened to permit access to the open channel 16 of the beam 14. The at least one fastener 40 is fastened to at least partially restrict access to the open channel 16. Further, the bracket 22 increases a rigidity 50 and stiffness of the beam 14. The bracket 22 stiffens the beam 14. As shown in FIG. 3, the plurality of brackets 22 are fastened with the plurality of bracket flanges 66 at the steering column area 30.

With further reference to FIG. 3, the beam 14 may include a flange 34 that extends outwardly from the first extremity wall 18 and the second extremity wall 20. The flange 34 may be shaped such that at least one of the first cross-section 24, the second cross-section 26, and the variable cross-section 28 are generally 22-shaped. Additionally, or alternatively, the 22 shape may be upside-down.

With even further reference to FIG. 3, the structural support apparatus 10 may include one or more structured elements 54. The structured elements 54 may include, for example, a frame, a mounting device, a harnessing device, an instrument panel, a wire, a terminal, a junction box, an air bag assembly, and more elements commonly associated with the instrument panel.

With reference to FIGS. 2-4, the structural support apparatus 10 includes a mounting location 52 located on the bracket 22. The mounting location 52 is where an instrument panel element 54 may be coupled or mounted with the beam 14. More specifically, the mounting location 52 is where the structural element 54 may be coupled with the bracket flange 66 of the beam 14. The mounting location 52 may be one side of the bracket flange 66 that faces outwardly from the beam 14. For example, the mounting location 52 may be a top side of the bracket flange 66. The bracket flange 66, and thus the mounting location 52, extend outwardly from at least one of the first extremity wall 18 and the second extremity wall 20. The beam 14 includes a first lateral end 56 and a second lateral end 58. The bracket flange 66, and thus the mounting location 52, extend outwardly from at least one of the first extremity wall 18 and the second extremity wall 20 between the first lateral end 56 and the second lateral end 58.

With further reference to FIG. 4, the structural element 54 may be coupled with the bracket 22. The bracket 22 may couple with the bracket flanges 66 on the mounting location 52. The structural element 54 may outwardly extend relative to the bracket 22, the mounting location 52, and the bracket flange 66. The structural element 54 may be coupled with an airbag assembly 38.

With even further reference to FIGS. 2-4, the brackets 22 may be unitarily formed with the structural element 54. The bracket flanges 66 may define a first set of apertures 68 that are configured to receive the fasteners 40, respectively. The brackets 22 may define a second set of apertures 70 that align with the first set of apertures 68 and are also configured to receive the fasteners 40, respectively. The bracket 22 bridges between the first extremity wall 18 and the second extremity wall 20 across the open channel 16. The bracket flange 66 may cantilever away from the open channel 16. Additionally, or alternatively, the bracket flange 66 may cantilever toward the open channel 16. A size of the brackets 22 may depend on a second distance 72 between a first aperture 74 of the first set of apertures 68, defined by a first bracket flange 78 of the plurality of bracket flanges 66, and a second aperture 76 of the first set of apertures 68, defined by a second bracket flange 80 of the plurality of bracket flanges 66. The second distance 72 is larger than the first distance 62 at the first cross-section 24, the second cross-section 26, and the variable cross-section 28, respectively. Additionally, or alternatively, the second distance 72 may be less than the first distance 62 when the second distance 72 and the first distance 62 are measured at different cross sections chosen from the first cross-section 24, the second cross-section 26, and the variable cross-section 28. The first cross-section 24 may be distal the steering column area 30. Additionally, or alternatively, the second cross-section 26 may be proximal the steering column area 30. Additionally, or alternatively, the first cross-section 24 may be proximal the steering column area 30; and the second cross-section 26 may be distal the steering column area 30.

With reference to FIG. 5, the first cross-section 24 is illustrated at line VIA-VIA, the second cross-section 26 is at line VIC-VIC, and the variable cross-section 28 therebetween is at line VIB-VIB. The first cross-section 24 is smaller than the second cross-section 26, and the variable cross-section 28 is sized between the first cross-section 24 and the second cross-section 26. The beam 14 may decrease in cross-sectional area along a direction of lateral extent from the first lateral end 56 toward the second lateral end 58. Additionally, or alternatively, the beam 14 may decrease in cross-sectional area along a reverse of the direction of lateral extent past line VIC-VIC away from line VIA-VIA and toward the first lateral end 56.

With reference to FIGS. 6A-6C, the first cross-section 24 of the beam 14 may generally be semi-circular. Additionally, or alternatively, the first cross-section 24 of the beam 14 may be generally tear drop shaped. The variable cross-section 28 of the beam 14 may generally be semi-circular. Additionally, or alternatively, the variable cross-section 28 of the beam 14 may be generally tear drop shaped. The second cross-section 26 of the beam 14 may generally be semi-circular. Additionally, or alternatively, the second cross-section 26 of the beam 14 may be generally tear drop shaped. Further, the second cross-section 26 of the beam 14 may be generally prismatic. The second cross-section 26 may be larger than the variable cross-section 28 and the first cross-section 24 to hold larger or a larger quantity of instrument panel elements 54, for example. FIGS. 6A-6C are not to scale.

With reference to FIG. 7, the beam 14 may define a recess 32. Further, the beam 14 may define at least one recess 32. Even further, the beam 14 may define a plurality of recesses 32. The first extremity wall 18 may define the recess 32. Additionally, or alternatively, the second extremity wall 20 may define the recess 32. The recess 32 is bounded by a periphery 36. The periphery 36 of the recess 32 is coupled with the flange 34. The flange 34 is around the periphery 36 of the recess 32, such that the recess 32 may be referred to as a flanged recess. Additionally, or alternatively, the flange 34 at the periphery 36 may be unitarily formed with the beam 14. For example, the beam 14 and flange 34 may be formed from a single stamp of metal 48. The recess 32 may permit the instrument panel element 54 to extend through at least one of the first extremity wall 18 and the second extremity wall 20, as shown in FIG. 8.

With reference to FIGS. 3,4, and 8, the instrument panel element 54 may include a loom 46. The loom 46 extends through the open channel 16 of the beam 14. Further, the loom 46 is bounded between the first extremity wall 18, the second extremity wall 20, and the bracket 22. To reveal and remove the loom 46, the bracket 22 could be, for example, unfastened at the first set of apertures 68 and the second set of apertures 70 via the fastener 40 and removed from the bracket flange 66. Therefore, the loom 46 could be fixed and secured within the channel 16 of the beam 14 by, for example, fastening the bracket 22 with the fastener 40 at the first set of apertures 68 and the second set of apertures 70 to couple the bracket 22 with the bracket flange 66. Therefore, the loom 46 may be beneath the bracket 22 and between the first extremity wall 18 and the second extremity wall 20. Further, the loom 46 may extend through the recess 32. The loom 46 may be a loom 46 of wiring 44. Further, the loom 46 may include an electrical system; therefore, the electrical system may be at least partially disposed inside of the open channel 16 of the beam 14. Additionally, or alternatively, the loom 46 may be referred to as an instrument panel harness.

With reference to FIGS. 1-8, the beam 14 may be stamped from a single sheet of metal 48. In other words, the beam 14 may include a unitary body 64. Additionally, or alternatively, the beam 14 may include a dual body welded together (not shown). Further, the beam 14 may include a body that comprises more than two welds (not shown). The beam 14 may be installed in the vehicle 12 by welding the beam 14 to pillars of the vehicle 12. Additionally, or alternatively, the beam 14 may be installed in the vehicle 12 by fastening the beam 14 to pillars of the vehicle 12. Additionally, or alternatively, the beam 14 may be installed in the vehicle 12 by welding the beam 14 to a chassis of the vehicle 12. Additionally, or alternatively, the beam 14 may be installed in the vehicle 12 by fastening the beam 14 to a chassis of the vehicle 12. The beam 14 may be installed in the vehicle 12 by welding the beam 14 to additional interfacing brackets.

The structural support apparatus 10 described above allows for space that would otherwise be un-useable or inaccessible within the vehicle 12 to be utilized and accessed. For example, the open channel 16 of the beam 14 allows for a loom 46 of wiring 44 to be hosted inside the open channel 16 and easily accessed. The brackets 22 may operably secure the loom 46 of the wiring 44 while fastened. Further, the brackets 22 may operably allow access to the loom 46 of the wiring 44 while unfastened.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:

a structural support apparatus including:

a beam extending laterally within the vehicle, wherein the beam defines an open channel configured to receive a loom of wiring, and wherein the beam includes:

a rear extremity wall; and a front extremity wall coupled with the rear extremity wall at a bottom of the beam, wherein the front extremity wall includes a flanged recess for the loom to extend outwardly from the open channel of the beam; and a plurality of brackets coupled with the beam across the open channel, wherein the plurality of brackets is configured to:

increase a rigidity of the beam;

fasten with the beam to enclose the loom of the wiring within the open channel;

unfasten from the beam to reveal the loom of the wiring within the open channel; and provide a respective plurality of mounting locations, wherein an instrument panel couples with at least one of the plurality of mounting locations.

2. The vehicle of claim 1, wherein the beam defines:

a first cross-section at a first lateral end of the beam; and a second cross-section at a second lateral end of the beam, wherein the second cross-section is larger than the first cross section.

3. The vehicle of claim 2, wherein the beam defines a variable cross-section between the first cross-section and the second cross section, and wherein the variable cross-section increases from the first cross-section to the second cross section.

4. The vehicle of claim 1, wherein the beam is stamped from a single or multiple sheet of metal.

5. A structural support apparatus for a vehicle, the apparatus comprising:

a beam extending laterally within the vehicle, the beam defining an open channel, wherein the beam includes:

a rear extremity wall; and a front extremity wall coupled with the rear extremity wall at a bottom of the beam, wherein the front extremity wall includes a flange and defines a recess;

a bracket fastened with the rear extremity wall and the front extremity wall, wherein the bracket bridges between the rear extremity wall and the front extremity wall, and wherein a distance between the rear extremity wall and the front extremity wall increases along a first direction of lateral extent;

an instrument panel mounted with the beam at the bracket; and a loom of wiring enclosed within the open channel of the beam beneath the bracket, wherein the loom of wiring extends through the recess.

6. The structural support apparatus of claim 5, wherein the beam is a unitary body formed from a single or multiple sheet of metal.

* * * * *